(12) United States Patent
Morrison et al.

(10) Patent No.: US 9,068,464 B2
(45) Date of Patent: Jun. 30, 2015

(54) METHOD OF JOINING CERAMIC PARTS AND ARTICLES SO FORMED

(75) Inventors: Jay A. Morrison, Oviedo, FL (US); Jay E. Lane, Mims, FL (US); Gary B. Merrill, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 2602 days.

(21) Appl. No.: 11/188,406

(22) Filed: Jul. 25, 2005

(65) Prior Publication Data

US 2005/0254942 A1 Nov. 17, 2005

Related U.S. Application Data

(63) Continuation-in-part of application No. 10/245,528, filed on Sep. 17, 2002, now Pat. No. 7,093,359.

(51) Int. Cl.
*B21D 53/78* (2006.01)
*F01D 5/28* (2006.01)
*B23P 15/04* (2006.01)
*F01D 9/04* (2006.01)

(52) U.S. Cl.
CPC .............. *F01D 5/282* (2013.01); *B23P 15/04* (2013.01); *Y10T 29/49337* (2015.01); *Y10T 29/49552* (2015.01); *F01D 5/284* (2013.01); *F01D 9/044* (2013.01); *F05D 2240/30* (2013.01); *F05D 2230/23* (2013.01)

(58) Field of Classification Search
CPC ......... F01D 5/282; F01D 5/284; F01D 9/044; F05D 2240/30; F05D 2230/23; B23P 15/04; Y10T 29/49552; Y10T 29/49337

USPC .............. 29/889.7, 889.71, 889.72, 889.721, 29/889.722, 446, 447, 458, 508; 428/293.4; 264/35, 332, 125, 241, 257, 264/258, 259, 267, 632, 653, 662, 672
See application file for complete search history.

(56) References Cited

U.S. PATENT DOCUMENTS

| | | | |
|---|---|---|---|
| 2,477,375 A | | 7/1949 | Jablonsky |
| 3,137,602 A | * | 6/1964 | Lincoln ....................... 156/89.22 |
| 3,854,189 A | * | 12/1974 | Ezis et al. ..................... 156/62.2 |
| 3,910,716 A | | 10/1975 | Roughgarden et al. |
| 4,122,894 A | * | 10/1978 | Laws et al. ....................... 165/76 |
| 4,330,568 A | * | 5/1982 | Boehm et al. ................. 427/452 |
| 4,396,349 A | | 8/1983 | Hueber |
| 4,519,745 A | | 5/1985 | Rosman et al. |
| 4,530,884 A | | 7/1985 | Erickson et al. |
| 4,563,125 A | | 1/1986 | Boudigues et al. |
| 4,563,128 A | | 1/1986 | Rossmann |
| 4,629,397 A | | 12/1986 | Schweitzer |
| 4,639,189 A | | 1/1987 | Rosman |
| 4,643,636 A | | 2/1987 | Libertini et al. |
| 4,645,421 A | | 2/1987 | Huether |

(Continued)

*Primary Examiner* — Ryan J Walters

(57) ABSTRACT

A method for joining a first CMC part (30) having an outer joining portion (32), and a second CMC part (36) having an inner joining portion (38). The second CMC part (36) is heat-cured to a stage of shrinkage more complete than that of the first CMC part (30) prior to joining. The two CMC parts (30, 36) are joined in a mating interface that captures the inner joining portion (38) within the outer joining portion (32). The assembled parts (30, 36) are then fired together, resulting in differential shrinkage that compresses the outer joining portion (32) onto the inner joining portion (38), providing a tightly pre-stressed joint. Optionally, a refractory adhesive (42) may be used in the joint. Shrinkage of the outer joining portion (32) avoids shrinkage cracks in the adhesive (42).

1 Claim, 3 Drawing Sheets

(56) References Cited

U.S. PATENT DOCUMENTS

| | | | |
|---|---|---|---|
| 4,768,924 A | 9/1988 | Carrier et al. | |
| 4,790,721 A | 12/1988 | Morris et al. | |
| 4,838,031 A | 6/1989 | Cramer | |
| 4,907,946 A | 3/1990 | Ciokajlo et al. | |
| 5,027,604 A | 7/1991 | Krueger | |
| 5,062,767 A | 11/1991 | Worley et al. | |
| 5,226,789 A | 7/1993 | Donges | |
| 5,306,554 A | 4/1994 | Harrison et al. | |
| 5,314,309 A | 5/1994 | Blakeley et al. | |
| 5,328,331 A | 7/1994 | Bunker et al. | |
| 5,358,379 A | 10/1994 | Pepperman et al. | |
| 5,375,978 A | 12/1994 | Evans et al. | |
| 5,382,453 A | 1/1995 | Mason | |
| 5,439,627 A | 8/1995 | De Jager | |
| 5,484,258 A | 1/1996 | Isburgh et al. | |
| 5,493,855 A | 2/1996 | Walters et al. | |
| 5,494,402 A | 2/1996 | Glezer et al. | |
| 5,584,652 A | 12/1996 | Shaffer et al. | |
| 5,605,046 A | 2/1997 | Liang | |
| 5,616,001 A | 4/1997 | Boyd | |
| 5,630,700 A | 5/1997 | Olsen et al. | |
| 5,640,767 A | 6/1997 | Jackson et al. | |
| 5,720,597 A | 2/1998 | Wang et al. | |
| 5,791,879 A | 8/1998 | Fitzgerald et al. | |
| 5,820,337 A | 10/1998 | Jackson et al. | |
| 5,879,766 A * | 3/1999 | Kato | 428/34.4 |
| 5,881,775 A | 3/1999 | Owen et al. | |
| 5,887,332 A | 3/1999 | Champenois et al. | |
| 6,000,906 A | 12/1999 | Draskovich | |
| 6,063,328 A * | 5/2000 | Kato | 264/632 |
| 6,126,889 A * | 10/2000 | Scott et al. | 264/632 |
| 6,164,903 A | 12/2000 | Kouris | |
| 6,197,424 B1 | 3/2001 | Morrison et al. | |
| 6,200,092 B1 | 3/2001 | Koschier | |
| 6,241,469 B1 | 6/2001 | Beeck et al. | |
| 6,315,941 B1 * | 11/2001 | Keller et al. | 264/643 |
| 6,325,593 B1 | 12/2001 | Darkins, Jr. et al. | |
| 6,368,663 B1 | 4/2002 | Nakamura et al. | |
| 6,451,416 B1 | 9/2002 | Holowczak et al. | |
| 6,514,046 B1 | 2/2003 | Morrison et al. | |
| 6,592,695 B1 * | 7/2003 | Polis et al. | 156/89.11 |
| 6,617,013 B2 * | 9/2003 | Morrison et al. | 428/293.4 |
| 6,648,597 B1 | 11/2003 | Widrig et al. | |
| 7,371,043 B2 * | 5/2008 | Keller | 415/173.1 |
| 7,413,700 B2 * | 8/2008 | Merrill et al. | 264/650 |
| 2003/0012939 A1 * | 1/2003 | Carper | 428/293.4 |
| 2003/0207155 A1 | 11/2003 | Morrison et al. | |
| 2003/0223861 A1 | 12/2003 | Morrison et al. | |
| 2008/0107521 A1 * | 5/2008 | Morrison et al. | 415/173.3 |
| 2008/0284059 A1 * | 11/2008 | Merrill et al. | 264/261 |

* cited by examiner

METHOD OF JOINING CERAMIC PARTS AND ARTICLES SO FORMED

CROSS REFERENCE TO RELATED APPLICATIONS

This application is a continuation-in-part of U.S. patent application Ser. No. 10/245,528, filed Sep. 17, 2002, now U.S. Pat. No. 7,093,359, incorporated by reference herein.

FIELD OF THE INVENTION

This invention relates generally to the field of ceramic materials, and more particularly to a method of joining ceramic elements.

BACKGROUND OF THE INVENTION

Gas turbine engines are known to include a compressor section for supplying a flow of compressed combustion air, a combustor section for burning a fuel in the compressed combustion air, and a turbine section for extracting thermal energy from the combustion air and converting that energy into mechanical energy in the form of a shaft rotation. Many parts of the combustor section and turbine section are exposed directly to the hot combustion gasses, for example the combustor, the transition duct between the combustor and the turbine section, and the turbine stationary vanes, rotating blades and surrounding ring segments.

It is also known that increasing the firing temperature of the combustion gas may increase the power and efficiency of a combustion turbine. Modern high efficiency combustion turbines have firing temperatures in excess of 1,600 degrees C., which is well in excess of the safe operating temperature of the structural materials used in the hot gas flow path components. Special super alloy materials have been developed for use in such high temperature environments, and these materials have been used with specific cooling arrangements, including film cooling, backside cooling and insulation.

Ceramic and ceramic matrix composite (CMC) materials offer the potential for higher operating temperatures than do metal alloy materials, due to the inherent refractory nature of ceramic materials. This capability may be translated into a reduced cooling requirement that, in turn, may result in higher power, greater efficiency, and/or reduced emissions from the engine.

Prior art ceramic turbine airfoil members may be formed with an associated shroud or platform member. The platform defines a flow path between adjacent airfoil members for directing the hot combustion gasses past the airfoil members. The platform is exposed to the same high temperature gas environment as the airfoil member and thus may be formed of a ceramic material. The platform and the airfoil members may be formed as separate components that are unconnected and are allowed to have relative movement between them. However, such designs may not adequately transfer aerodynamic torque loads from the airfoil to the platform attachments. Alternatively, the platform and the airfoil may be formed as separate components that are mechanically joined together, as illustrated in U.S. Pat. No. 5,226,789. Such mechanical joints must be robust, and thus tend to be complicated and expensive.

Another alternative for joining the airfoil and the platform is to form the platform and the airfoil as a single integral part. Monolithic ceramic is readily moldable to a form, but it is limited to small shapes and is insufficiently strain-tolerant for robust designs. CMC materials incorporate ceramic fibers in a ceramic matrix for enhanced mechanical strength and ductility. However, conventional ceramic composite processing methods increase in complexity and cost in a complex three-dimensional component such as a turbine vane. U.S. Pat. No. 6,200,092 describes a turbine nozzle assembly having a vane forward segment formed of CMC material wherein the reinforcing fibers are specially oriented across the juncture of the airfoil and the platform members. Such special fiber placement in the airfoil-to-platform transition region presents a manufacturing challenge, especially with insulated CMC construction. Furthermore, for some CMC compositions, shrinkage during processing may result in residual stresses in complex shapes that are geometrically constrained. The airfoil-to-platform attachment area is one area where such stresses would arise. Additionally, load transfer between the airfoil and the platform results in interlaminar stresses in the fillet region where mechanical properties may be compromised.

In one solution to these problems, U.S. Pat. No. 6,648,597 discloses a method of manufacture for a vane component of a gas turbine, including: forming an airfoil member of a ceramic matrix composite material; forming a platform member of a ceramic matrix composite material; and forming an integral vane component by bonding respective joint surfaces of the airfoil member and the platform member. The method may further include: forming the airfoil member of a ceramic matrix composite material in a green body state; forming the platform member of a ceramic matrix composite material in a green body state; and urging the respective joint surfaces of the airfoil member and the platform member together at a firing temperature to form a sinter bond between them. The method may include densifying the sinter bond with a matrix infiltration process. The method may further include reinforcing the sinter bond with a fastener connected between the respective joint surfaces. Alternatively, the method may include bonding the respective joint surfaces of the airfoil member and the platform member with an adhesive. However, ceramic joints using refractory adhesives alone are weak and unreliable for carrying primary loads (mechanical, unrelenting loads). Furthermore, when such adhesives are applied to already-fired CMC parts in constrained geometries, the adhesives shrink and produce bond joint cracking.

BRIEF DESCRIPTION OF THE DRAWINGS

The invention is explained in following description in view of the drawings that show.

DETAILED DESCRIPTION OF THE INVENTION

Figure 1:
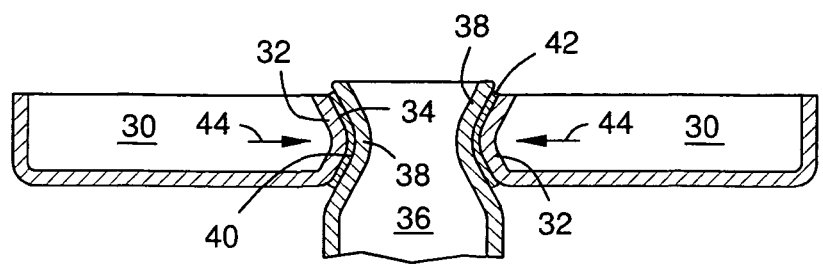
FIG. 1 is a schematic sectional view of a joint in ceramic parts having a first mating geometry according to aspects of the invention.

FIG. 1 shows a schematic sectional view of a joint between a first ceramic part 30 and a second ceramic part 36. The first ceramic part 30 has an outer joining portion 32 with an inner surface 34. The second ceramic part 36 has an inner joining portion 38 with an outer surface 40 that mates with the inner surface 34 of the outer joining portion 32. The second ceramic part 36 is heat-cured to a stage of shrinkage more complete than that of the first ceramic part 30 prior to joining. This means that both of these parts may be partially heat-cured to different stages, or the first ceramic part 30 may be left in a green body state and the second ceramic part 36 may be partially or fully cured. The term "green body state" includes stages of processing from a wet preform to a semi-fired state in which parts are rigid enough to be self-supporting. The outer joining portion 32 may be formed onto the inner joining portion 38, such as by using the outer surface 40 of the inner joining portion 38 as a mold for lay-up of the first ceramic part 30 as a ceramic matrix composite (CMC) member. The assembly is then fully heat-cured. The first ceramic part 30 shrinks to a greater percentage than the second ceramic part 36. This causes differential shrinkage 44, 46 of the outer joining portion 32 relative to the inner joining portion 38, which tightens the outer joining portion 32 on the inner joining portion 38, producing a pre-stressed joint. This method is especially useful for joining a first ceramic part 30 of CMC to a second ceramic part 36 of CMG, monolithic ceramic, and/or ceramic insulation.

A refractory adhesive 42 may be applied in the joining step. This fills any clearance between the outer joining portion 32 and the inner joining portion 38. For example a high temperature ceramic adhesive such as from Cotronics® (Resbond 989 or 904), Aremco® (Ceramabond 503, 600, or 516), Saueri-zon® (phosphate based adhesives), or Zircar® (ZR-COM) or variations on these basic adhesive types may be used. Shrinkage cracking in refractory adhesives is greatly reduced in the present method, because the outer joining portion 32 shrinks concurrently with the adhesive 42 and radially follows and compresses the adhesive. If an adhesive 42 or other filler is not used, the joining portions 32 and 38 may be formed and/or machined to minimize clearance between them. The outer joining portion 32 may be formed by CMC layering or continuous wrapping of ceramic fibers onto the inner joining portion 38 using the inner joining portion 38 as a form or mandrel for the outer joining portion 32 to eliminate all clearance there between. The fibers are impregnated with a ceramic matrix material, either before or after the wrapping step, to form a ceramic matrix composite material.

Figure 2:
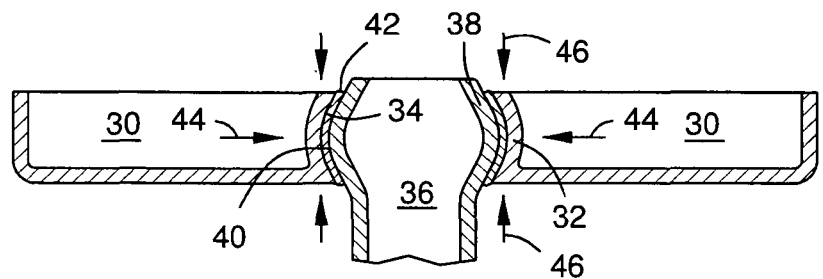
FIG. 2 is a sectional view of a second mating geometry providing a bilateral shrinkage preload.
Figure 3:
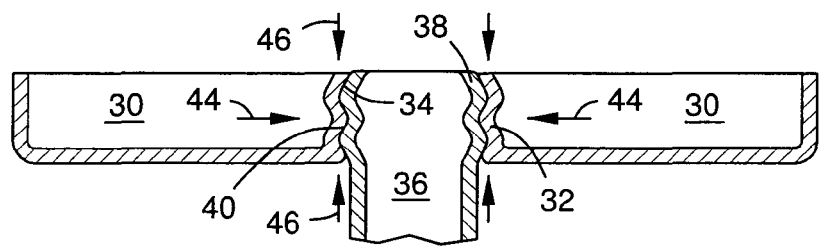
FIG. 3 is a sectional view of a third mating geometry with greater interlocking achieved by forming the outer joining part on the inner joining part.

In FIGS. 1-3 the outer joining portion 32 and inner joining portion 38 have mating geometries that retain the inner joining portion 38 within the outer joining portion 32 in at least two dimensions, X and Y relative to the drawing, after the joining step. In FIGS. 1-3 the first ceramic part 30 can be provided as a single part. In this case, the inner joining portion 38 slides into the outer joining portion 32 along the Z dimension in the joining step. Alternately, the first ceramic part 30, or at least the outer joining portion 32, can be provided in two or more sections or slotted segments as later shown. These sections are first spread, then closed, around the inner joining portion 38, and are then fixed by a compression ring 54 as next shown. With such segmented assembly, the mating geometries of FIGS. 1-3 retain the inner portion 38 within the outer portion in three dimensions after the joining step.

Figure 4:
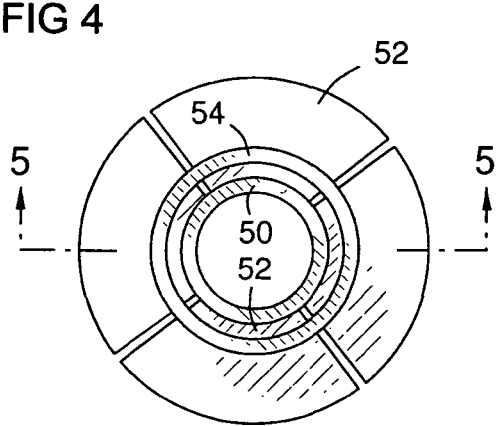
FIG. 4 is a top view of a multi-part flange joined to a cylinder using clamping force provided by heat-curing shrinkage of a compression ring.
Figure 5:
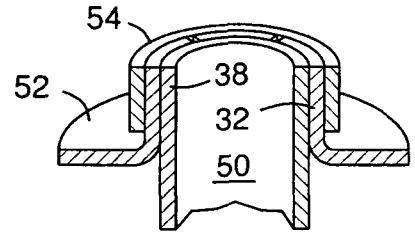
FIG. 5 is a sectional view taken along line 5-5 of FIG. 4.
Figure 6:
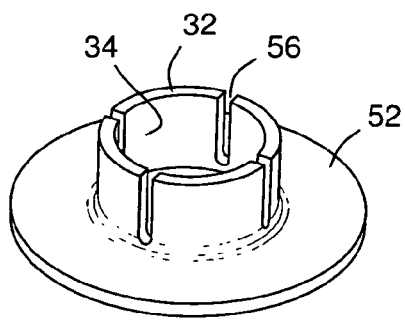
FIG. 6 is a perspective view of a flange with an outer joining portion segmented by slots

FIGS. 4 and 5 illustrate a ceramic cylinder 50 joined with a ceramic segmented flange 52 held in place by a compression ring 54, such as a CMC material. The compression 54 can be separately formed and applied in the green body state or it can be filament-wound around the outer joining portion 32 of the flange 52 in a wet state. In the latter case, drying shrinkage of the winding adds to the firing shrinkage to achieve an even greater amount of preload. The segmented flange 52 can be formed of multiple pieces as in FIGS. 4 and 5, or in one piece with slots 56 in the outer joining portion 32 as in FIG. 6, to allow compliance.

Figure 7:
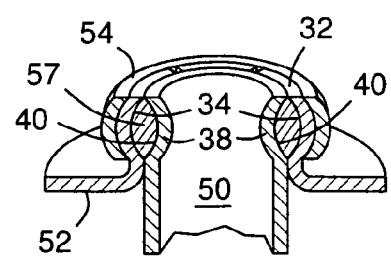
FIG. 7 is a sectional view of two parts interlocked by an intermediate insert and clamped by shrinkage of a compression ring.

FIG. 7 shows an embodiment using a segmented flange 52 with an interlocking geometry including an intermediate locking ring 57. This locking ring 57 can be applied as wet ceramic paste to both the inner surface 34 of the outer joining portion 32 and the outer surface 40 of the inner joining portion 38 prior to joining. It fills annular depressions in both of these surfaces, and merges into a single ring of material during joining and firing. Shrinkage in the locking ring 57 material during firing is accommodated by shrinkage in the compression ring 54, reducing internal cracking in the locking ring 57 material. The locking ring 57 eliminates any possibility of separation or relative slippage between the parts in the direction of the longitudinal axis of cylinder 50. If the flange is a multi-part type, the locking ring 57 can be pre-formed as a multi-part ring for assembly around the inner joining portion 38 during the joining step.

The ceramics utilized for the CMC materials in the joined parts may be oxide or non-oxide materials, for example alumina, mullite, silicon carbide, etc. The CMC compression ring 54 windings can be made with fibers other than those in the cylinder 50 or flange 52 pieces. Fibers with higher shrinkage, such as Nextel® 610 fibers (alumina) can be used in the compression ring versus Nextel® 720 fibers (alumina/mullite) typically used for the other parts. The higher shrinkage of the compression ring fibers imparts an even greater amount of prestress to the joint. Furthermore, the alumina fibers exhibit a greater coefficient of thermal expansion than do the alumina/mullite fibers, thereby imparting an additional amount of prestress as a result of the differential thermal expansion between the two types of fibers. The amount of prestress created by the drying shrinkage, the firing shrinkage and the thermal expansion of the mating parts can be selected to achieve a desired degree of prestress for both cold and hot conditions for any particular application. In one test embodiment, it was found that the combination of stresses imposed by drying and firing shrinkage and by differential thermal expansion was actually too high and resulted in an overstress condition in a CMC material containing Nextel® 610 fibers that were wet wrapped around a fully fired CMC member containing Nextel® 720 fibers. In order to reduce the level of prestress in such an embodiment, the Nextel® 610 fibers could be wet wrapped around a green body CMC member containing Nextel® 720 fibers, for example.

Figure 8:
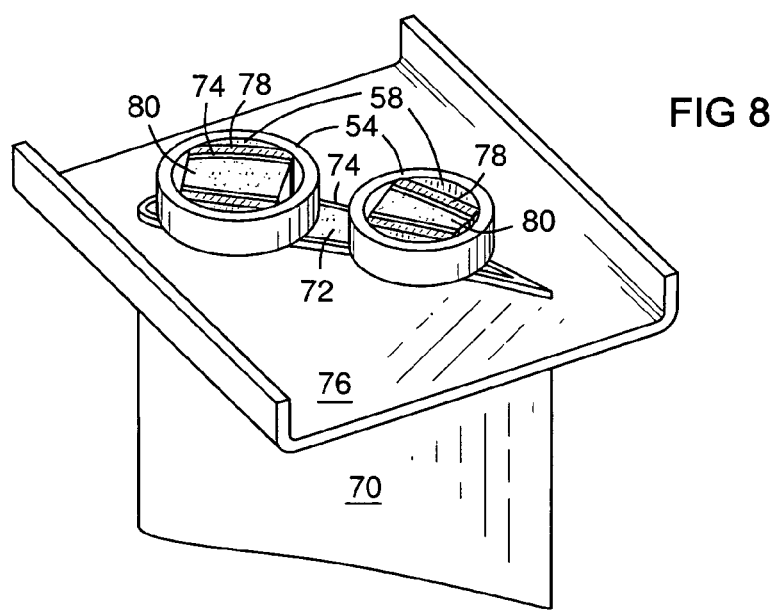
FIG. 8 is a perspective view of a gas turbine vane joined to a platform member using compression rings.
Figure 9:
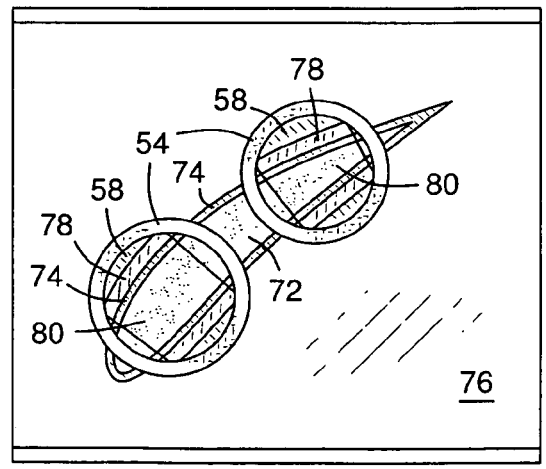
FIG. 9 is a top view of the gas turbine vane and platform member of FIG. 8.
Figure 10:
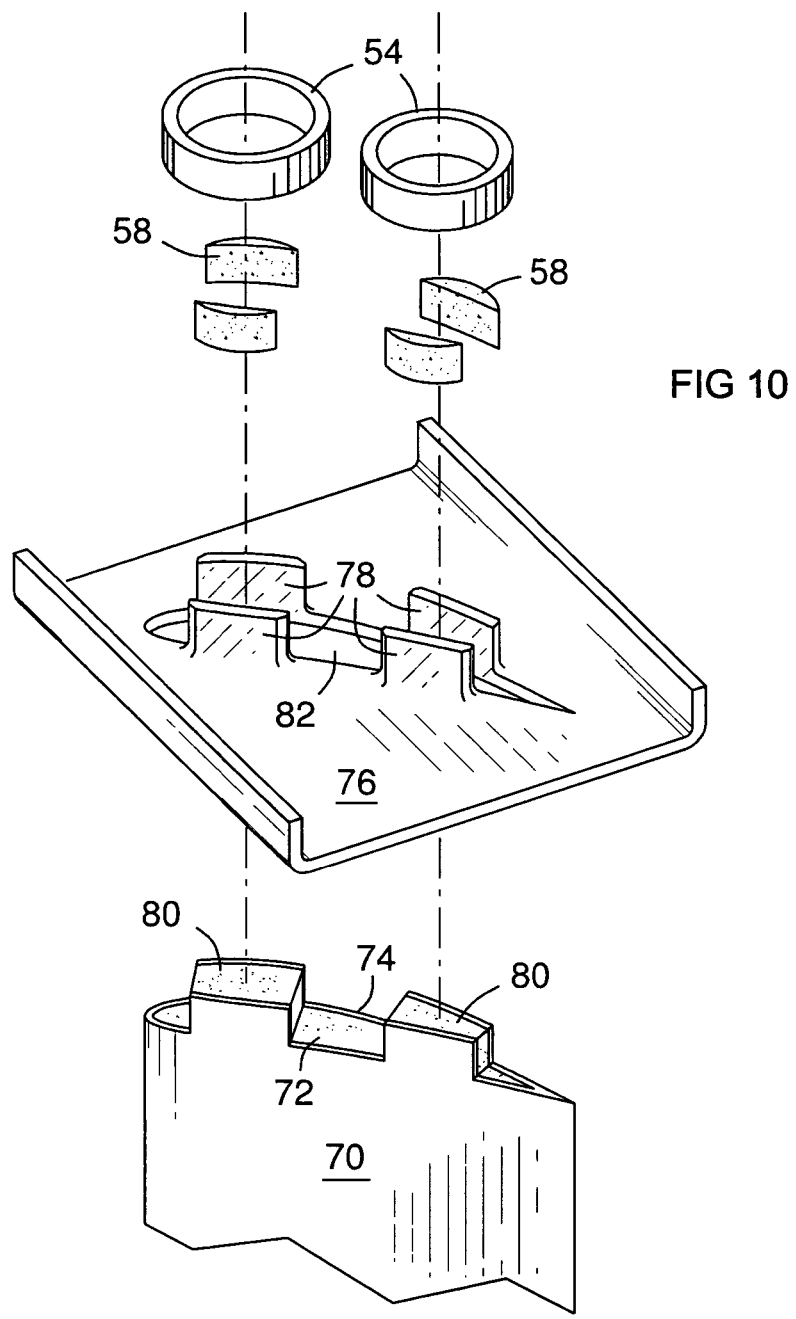
FIG. 10 is an exploded view of the gas turbine vane and platform member FIG. 8.

FIGS. 8-10 show how the present joining method might be applied to an airfoil-to-platform assembly. A gas turbine vane airfoil 70 may be formed comprising a core 72 and a skin 74. For example, the core 72 may be a monolithic ceramic, and the skin 74 may be CMC and/or an insulating ceramic layer. One or both ends of the vane airfoil 70 may be attached to a respective platform member 76 by the present method. Outer joining portions are provided on the platform member in the form of tabs 78 extending from an opening 82 in the platform, as shown, to receive inner joining portions on an end of the vane airfoil 70. In this embodiment, inner joining portions are provided on the ends of the vane airfoil 70 in the form of bosses 80, as shown, formed in this example by removing parts of the ends of the vane airfoil 70. The bosses 80 on the vane airfoil 70 are placed into the outer joining tabs 78 of the platform member 76, and are clamped by differential shrinkage of compression rings 54 as previously described. One or more boss may be used and each boss may be adjoined to one or two opposed tabs in various embodiments. A filler material 58 may be inserted in some or all of the gaps between the compression rings 54 and the clamped parts 78 and 80. Alternately, the inner joining bosses 80 and outer joining tabs 78 may be formed or machined with cylindrical side surfaces to match the inner surface of the compression rings 54, thus avoiding some or all of the filler 58. A refractory adhesive 42 may be used as previously described.

The vane airfoil 70 and/or the platform member 76 may be produced from a plurality of individual parts that are bonded or joined together in any variety of ways, or they may be formed as single-piece parts. The platform member 76 may be formed in two or more parts that are joined together during the joining step for the present method, with or without additional joining methods.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of forming a joint in a ceramic component, the method comprising:
    adjoining a first surface of a first ceramic member to a second surface of a second ceramic member;
    disposing a ceramic matrix composite compression ring about the adjoined surfaces, the first and second ceramic members being cured to a stage of shrinkage greater than a stage of shrinkage of the compression ring;
    co-firing the first ceramic member, the second ceramic member and the compression ring to induce differential firing shrinkage between the compression ring and the first and second ceramic members to generate a compressive prestress urging the first surface and the second surface together;
    wherein the first and second ceramic members are geometrically interlocked preventing movement between the first and second members in any and all directions;
    wherein the adjoining comprises disposing a ceramic locking ring to fill opposed annular depressions in the first and second surfaces.

* * * * *